United States Patent
Yada et al.

(10) Patent No.: US 6,936,177 B2
(45) Date of Patent: Aug. 30, 2005

(54) METHOD FOR REMOVING METAL FROM WASTEWATER

(75) Inventors: Shuhei Yada, Yokkaichi (JP); Kenji Takasaki, Yokkaichi (JP); Yasushi Ogawa, Yokkaichi (JP); Yoshiro Suzuki, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/854,254

(22) Filed: May 27, 2004

(65) Prior Publication Data

US 2004/0217062 A1 Nov. 4, 2004

Related U.S. Application Data

(63) Continuation of application No. PCT/JP02/12199, filed on Nov. 21, 2002.

(30) Foreign Application Priority Data

Nov. 28, 2001 (JP) .................................... 2001-362141

(51) Int. Cl.$^7$ ................................................ C02F 1/62
(52) U.S. Cl. .................... 210/726; 210/725; 210/728; 210/761; 210/912; 562/600; 568/492
(58) Field of Search .................................. 210/718, 724, 210/725, 726, 727, 912, 761; 562/600; 568/492

(56) References Cited

U.S. PATENT DOCUMENTS

| | | | | |
|---|---|---|---|---|
| 3,912,626 A | * | 10/1975 | Ely et al. ..................... | 210/710 |
| 4,094,780 A | | 6/1978 | Iwai et al. .................... | 210/38 |
| 4,618,709 A | * | 10/1986 | Sada et al. .................... | 562/532 |
| 5,273,661 A | * | 12/1993 | Pickett et al. ................ | 210/710 |
| 6,638,432 B2 | * | 10/2003 | Matsumoto et al. ........ | 210/710 |

FOREIGN PATENT DOCUMENTS

| | | |
|---|---|---|
| EP | 0 448 178 | 9/1991 |
| EP | 1 166 851 | 1/2002 |
| JP | 55-013181 | 1/1980 |
| JP | 04-118095 | 4/1992 |
| JP | 5-23696 | 2/1993 |
| JP | 11-347570 | 12/1999 |

* cited by examiner

*Primary Examiner*—Peter A. Hruskoci
(74) *Attorney, Agent, or Firm*—Wenderoth, Lind & Ponack, L.L.P.

(57) ABSTRACT

An object of the present invention is to provide a method for efficiently removing a metal from wastewater formed by subjecting the liquid waste to wet combustion treatment or wet oxidation treatment, said liquid waste resulting from an acrylic acid production process.

Provided is a method for removing a metal from wastewater formed by subjecting at least a part of liquid waste to wet combustion treatment or wet oxidation treatment, said liquid waste resulting from an acrylic acid production process involving the steps of forming acrylic acid through catalytic vapor phase oxidation of at least one of propane, propylene, and acrolein, and purifying the acrylic acid through distillation, wherein the method comprises the steps of:
      (a) removing a solid content from the wastewater;
      (b) removing carbonate ions and carbonate salts from the treated liquid obtained by the step (a); and
      (c) removing a metal from the treated liquid from the step (b).

3 Claims, 1 Drawing Sheet

METHOD FOR REMOVING METAL FROM WASTEWATER

This application is a continuation of International Application No. PCT/JP02/12199 filed Nov. 21, 2002.

TECHNICAL FIELD

The present invention relates to a method for removing a metal from liquid waste resulting from an acrylic acid production process.

BACKGROUND ART

A solid catalyst containing as a component molybdenum oxide and a copper compound are often used as a catalyst and as an auxiliary agent, respectively, in production of acrylic acid. Liquid waste resulting from an acrylic acid production process contains the above metals.

Examples of a method for removing a metal from the liquid waste resulting from an acrylic acid production process generally include the following methods: (1) a method for removing a metal by adjusting a pH of the liquid waste, adding a precipitating agent, subsequently adding a coagulant, and separating the settled solid content using a filter press or a centrifuge; and (2) a method for removing a metal by further combining an adsorbent or an ion-exchange resin.

On the other hand, the liquid waste resulting from an acrylic acid production process contains various organic substances such as acetic acid and aldehydes. Thus, a method of wet combustion or wet oxidation is employed to convert the organic substances into harmless carbon dioxide gas, water, and the like. However, even if the organic substances are detoxified, the metal in the liquid waste remains intact in wastewater of the treated liquid.

The above conventional method for removing a metal from the liquid waste is not a technique intended for wastewater formed by subjecting the liquid waste to wet combustion treatment or wet oxidation treatment. Thus, the above method had problems when applied to the wastewater in that metal removal efficiency decreases depending on specific properties of the wastewater, and more specifically, in that amounts of agents used and concentrations of the remaining metals increase further compared to those of usual water.

Meanwhile, the "wet combustion" refers to a treatment method for liquid waste suppressing generation of NOx or SOx by subjecting the liquid waste to combustion treatment while collecting gas generated through combustion using an aqueous alkaline solution. The "wet oxidation" refers to another treatment method for liquid waste subjecting the liquid waste to oxidation treatment by supplying the liquid waste to be treated to water under high temperature and high pressure and further supplying oxygen thereto.

However, liquid waste containing acidic substances such as acrylic acid-containing liquid waste is generally neutralized with an alkali in advance and then supplied to a treatment equipment.

DISCLOSURE OF THE INVENTION

The present invention has been made in view of the above problems, and an object of the present invention is therefore to provide a method for efficiently removing a metal from wastewater resulting from an acrylic acid production process.

The inventors of the present invention, through various studies for solving the above problems, have found out that, when a method is employed which removes a metal from wastewater formed by subjecting at least a part of liquid waste to wet combustion treatment or wet oxidation treatment, said liquid waste resulting from an acrylic acid production process, a metal can be efficiently removed by conducting a step of precipitating the metal existing in the wastewater in multiple steps.

In other words, the present invention is as follows.

(1) A method for removing a metal from wastewater formed by subjecting at least a part of liquid waste to wet combustion treatment or wet oxidation treatment, said liquid waste resulting from an acrylic acid production process involving the steps of forming acrylic acid through catalytic vapor phase oxidation of at least one of propane, propylene, and acrolein, and purifying the acrylic acid through distillation, wherein the method includes the steps of:

(a) removing a solid content from the wastewater;

(b) removing carbonate ions and carbonate salts from the treated liquid obtained by the step (a); and (c) removing a metal from the treated liquid obtained by the step (b).

(2) The method for removing a metal from wastewater from acrylic acid production according to the above item (1), wherein the metal removed in the step (c) is at least one of molybdenum and copper.

(3) The method for removing a metal from wastewater from acrylic acid production according to the above item (1), by removing copper simultaneous with the step (a) or prior to the step (b) after the step (a), wherein the metal removed in the step (c) is molybdenum.

Hereinafter, the present invention will be described in detail.

The present invention provides a method for removing a metal from wastewater formed by subjecting at least a part of liquid waste to wet combustion treatment or wet oxidation treatment, said liquid waste resulting from acrylic acid production through catalytic vapor phase oxidation of at least one of propant, propylene, and acrolein, wherein the method comprises the steps of (a) to (c):

(a) removing a solid content from the wastewater;

(b) removing carbonate ions and carbonate salts from the treated liquid obtained by the step (a); and (c) removing a metal from the treated liquid obtained by the step (b).

The wastewater from acrylic acid production according to the present invention is formed by subjecting at least a part of liquid waste to wet combustion treatment or wet oxidation treatment, said liquid waste resulting from an acrylic acid production process involving the steps of forming acrylic acid through catalytic vapor phase oxidation of at least one of propane, propylene, and acrolein, and purifying the acrylic acid through distillation.

The liquid waste resulting from an acrylic acid production process contains various organic substances such as acetic acid and aldehydes. Thus, a method of wet combustion or wet oxidation is employed to convert the organic substances into harmless carbon dioxide gas, water, and the like.

The "wet combustion" refers to a treatment method for liquid waste suppressing generation of NOx or SOx by subjecting the liquid waste to combustion treatment while collecting gas generated through combustion using an aqueous alkaline solution such as caustic soda. When the caustic soda is used as an aqueous alkaline solution, the caustic soda also exists in the wastewater. In addition, a large amount of carbon dioxide gas formed through combustion exists in a form of sodium carbonate or the like.

The "wet oxidation" refers to another treatment method for liquid waste subjecting the liquid waste to oxidation treatment by supplying the liquid waste to be treated to water under high temperature and high pressure and further supplying oxygen thereto. When subjecting liquid waste containing acidic substances to the wet oxidation treatment, the caustic soda or the like is generally used for neutralization to prevent corrosion of an equipment. In this case, similarly to the case of the wet combustion, a large amount of carbon dioxide gas is dissolved in the wastewater in a form of sodium carbonate or the like.

As described above, molybdenum oxide as a part of a catalyst component and a copper compound as an auxiliary agent for purification are often used in acrylic acid production. The liquid waste resulting from an acrylic acid production process contains the above metals. The wastewater formed by subjecting the liquid waste to wet combustion treatment or wet oxidation treatment obviously contains metals of molybdenum and copper. However, it is difficult to remove those metals from the wastewater compared to removing those metals from usual water. The reason is that a large amount of the carbonate ions and the carbonate salts, derived from the wet combustion or the wet oxidation, exist in the wastewater.

The liquid waste is subjected to wet combustion treatment or wet oxidation treatment through a usual method.

The wastewater obtained through the wet combustion treatment or wet oxidation treatment is not particularly limited, and generally has the following composition.

Copper, which is one of the metals in the wastewater, generally accounts for 40 to 500 ppm by weight in total and 10 to 80 ppm by weight as a dissolved content. The solid content mainly consists of copper salts and copper oxides.

Molybdenum, which is one of the metals in the wastewater, is completely dissolved and usually accounts for 3 to 50 ppm by weight.

Carbon fine particles account for less than 1 ppm by weight, but may unsteadily increase to several ppm by weight.

Sodium accounts for 0.2 to 8% by weight and mainly exists in forms of sodium carbonate and caustic soda.

The treated wastewater has a pH of 8 to 10.2, and temperature of the wastewater formed through the wet combustion treatment or wet oxidation treatment is generally 80° C. or more during discharge of the wastewater.

The present invention provides a method for efficiently removing a metal from the wastewater by treating the wastewater formed through the wet combustion treatment or wet oxidation treatment following the steps described below.

The above step (a) of removing a solid content from the wastewater according to the present invention is a step of obtaining treated liquid (hereinafter, treated liquid obtained by removing the solid content is referred to as "treated liquid 1") by coagulating and precipitating copper existing as a solid content to facilitate solid-liquid separation. For example, the treated liquid 1 can be obtained through formation of a solid content by adding a coagulant to the wastewater and through removal of the solid content by using a sedimentation tank, membrane separation, or the like.

The solid content existing in the wastewater is mainly derived from copper, and specific examples of copper components include $Cu_2O$, $Cu_2(CO_3)(OH)_2$, $CuO$, and $Cu$.

As a method for forming a solid content in the step (a), a precipitating agent is generally combined to further decrease metal concentration. The reason for use of the coagulant alone instead of in combination with the precipitating agent is that even if a copper content in a solution is precipitated by a precipitating agent, a copper content existing as solid in another form (copper carbonate, for example) dissolves, resulting in hardly decreasing copper concentration in the solution. An excess precipitating agent must be added with respect to concentration of the dissolved copper for decreasing the copper concentration. Thus, the use of the precipitating agent in the step (a) hardly provides an expected effect and is economically disadvantageous.

A cation polymer coagulant is preferably used in the step (a) as a coagulant. Specific examples of the cation polymer coagulant include Dia Clear MK, MK5000 (available from Dia-Nitrix Co., Ltd.), ARON FLOC C-302, C-303 (available from Toagosei Co., Ltd.), and NALCO 1450, 1460 (available from Nalco Japan Co., Ltd.). The coagulant is preferably added to the liquid waste in an amount of 0.001 to 2% by weight.

The sedimentation tank used in the step (a) is a tank for separating a solid content formed by adding a coagulant. The solid content formed generally settles in few minutes. The solid content and liquid may not necessarily have to be completely separated in the step (a), and removing most of the solid is sufficient.

Examples of the sedimentation tank used in the present invention include a cylindrical container provided with a conical portion (cone-shaped portion) in a bottom portion or a cylindrical or polygonal container provided with a plurality of inclined plates inside the container.

The copper concentration decreases to about 10 to 30 ppm by weight through this operation. The molybdenum concentration does not change.

Fine particles do not have to be trapped when membrane separation is employed instead of a method using a sedimentation tank. The reason is that the concentration of the copper dissolved is 10 ppm by weight or more, which would result in a small effect. A means for the membrane separation used in the present invention includes a method of separation by filtration using a hollow fiber membrane. Specific examples of the hollow fiber membrane include Kuraray SF Filter (available from Kuraray Co., Ltd.) and Microza MF (available from Asahi Kasei Corporation).

The treated liquid 1 is obtained as described above. Further, an operation of removing a solid content may be conducted once, but is preferably repeated several times in the step (a) By repeating, the copper concentration can be further decreased.

The twice or more repeated removal of a solid content in the step (a) involves: adding a precipitating agent, preferably adding a coagulant in combination therewith, to the obtained treated liquid 1 to precipitate a solid content; and removing the solid content using the sedimentation tank, the membrane separation means, or the like (hereinafter, collectively referred to as "separation by filtration"). Examples of the precipitating agent used here include: sulfur compounds such as dimethylcarbamate, trimercaptotriazine, and sodium sulfate; and polyamine precipitating agents such as NAL-MET (registered trademark, available from Nalco Japan Co., Ltd.). The amount of the precipitating agent added is preferably 5 to 30-fold in weight ratio with respect to copper (metal). The same coagulant as the one used for forming the first solid content in the step (a) can be used. The amount of the coagulant added is preferably 0.01 to 2% by weight with respect to a weight of the substance to be treated. A method of precipitating a metal hydroxide using a strong base such as sodium hydroxide or potassium hydroxide, which is a method widely used for metal separation, is not very preferable because an amount of an acid used during decarbonation treatment of the next step increases.

The step (b) according to the present invention is a step of removing carbonate ions and carbonate salts from the treated liquid 1.

The carbonate ions and the carbonate salts are removed from the treated liquid 1 for efficiently precipitating a dissolved metal in the subsequent step (c).

A method of removing the carbonate ions and the carbonate salts (hereinafter, which may also be referred to as "decarbonation") includes a method involving adding an acid such as sulfuric acid and hydrochloric acid to the treated liquid 1 to gasify a carbonate group portion as carbon dioxide and discharging the carbon dioxide. The treated liquid may be warmed (hereinafter, the treated liquid obtained through decarbonation is referred to as "treated liquid 2") to increase a discharging rate of the carbon dioxide.

The following problems arise if the step (c) is conducted (adding precipitating agent for removing metal) without removing the carbonate ions and the carbonate salts:

(1) carbonate micro bubbles form through a pH change during addition of the precipitating agent, and the bubbles cause the precipitated solid content to float, tending to hinder settling and separation of the solid content;

(2) it is difficult finely to adjust the pH because of a buffer action of sodium carbonate in the treated liquid 1 on pH; and (3) a large amount of the precipitating agent is required in the step (c) because of carbonate existence.

If a decarbonation operation is first conducted without removing the solid content as in the step (a), copper salts already existing in the wastewater as solid dissolve with addition of an acid (decrease of pH). Further, the amount of the acid required at this time increases (by amount consumed for dissolving solid) as well. This process is not preferable because the amount of the precipitating agent used in the next step obviously must be also increased for re-precipitating the dissolved copper.

Completion of the decarbonation can be confirmed with a pH reaching a fixed value (4.0) or less.

The step (c) according to the present invention is a step of removing a metal from the treated liquid 2, and the metal removed in the step is mainly molybdenum and/or copper. If the step of removing the solid content is repeated twice or more in the step (a), the metal removed in the step (c) is molybdenum.

A method of removing the metals of molybdenum and copper from the treated liquid 2 includes a method involving adding a precipitating agent for precipitating copper dissolved in the treated liquid 2, settling a copper component to remove the solid content, adding a precipitating agent for precipitating molybdenum, and preferably adding a coagulant in combination therewith, to settle a molybdenum component and remove the solid content.

Examples of the precipitating agent for precipitating copper used in the step (c) include sodium hydroxide and potassium hydroxide, and the copper in the treated liquid precipitates as copper hydroxide to be removed. Further, examples of the precipitating agent for precipitating molybdenum include divalent or trivalent iron salts such as iron (III) chloride, iron (II) sulfate, and NALCO 8131 (available from Nalco Japan Co., Ltd.). Examples of the coagulant include an anion polymer coagulant, and specific examples thereof include Soil hard (available from Dia-Nitrix Co., Ltd.), Dia Clear MA (available from Dia-Nitrix Co., Ltd.), ARON FLOC A-104, A-101 (available from Toagosei Co., Ltd.), and NALCO 9601 (available from Nalco Japan Co., Ltd.).

The amount of the precipitating agent for precipitating copper added to the treated liquid 2 is preferably 5 to 30-fold in weight ratio with respect to the weight of the copper. The amount of the precipitating agent for precipitating molybdenum added is preferably 3 to 30-fold in weight ratio with respect to the weight of the molybdenum. The coagulant added is preferably 0.01 to 2% by weight with respect to the weight of the substance (precipitated product) to be treated.

The settled solid content is removed through separation by filtration or the like.

If the step of removing a solid content in the step (a) is repeated twice, only molybdenum is removed in the step (c).

The solid content formed in the step (a) and the step (c) contains much water. Therefore, it is preferable to decrease the water content to about 50% using a filter press, a centrifuge (dehydrator), or the like and to circulate liquid with the solid content removed to any one of the steps (a) to (c) for removing a metal.

The wastewater with a metal removed as described above sufficiently satisfies environmental standards, not posing any problems even if the wastewater is directly discharged to the environment. Further, the wastewater can be reused in an acrylic acid production process.

BEST MODE FOR CARRYING OUT THE INVENTION

Figure 1:
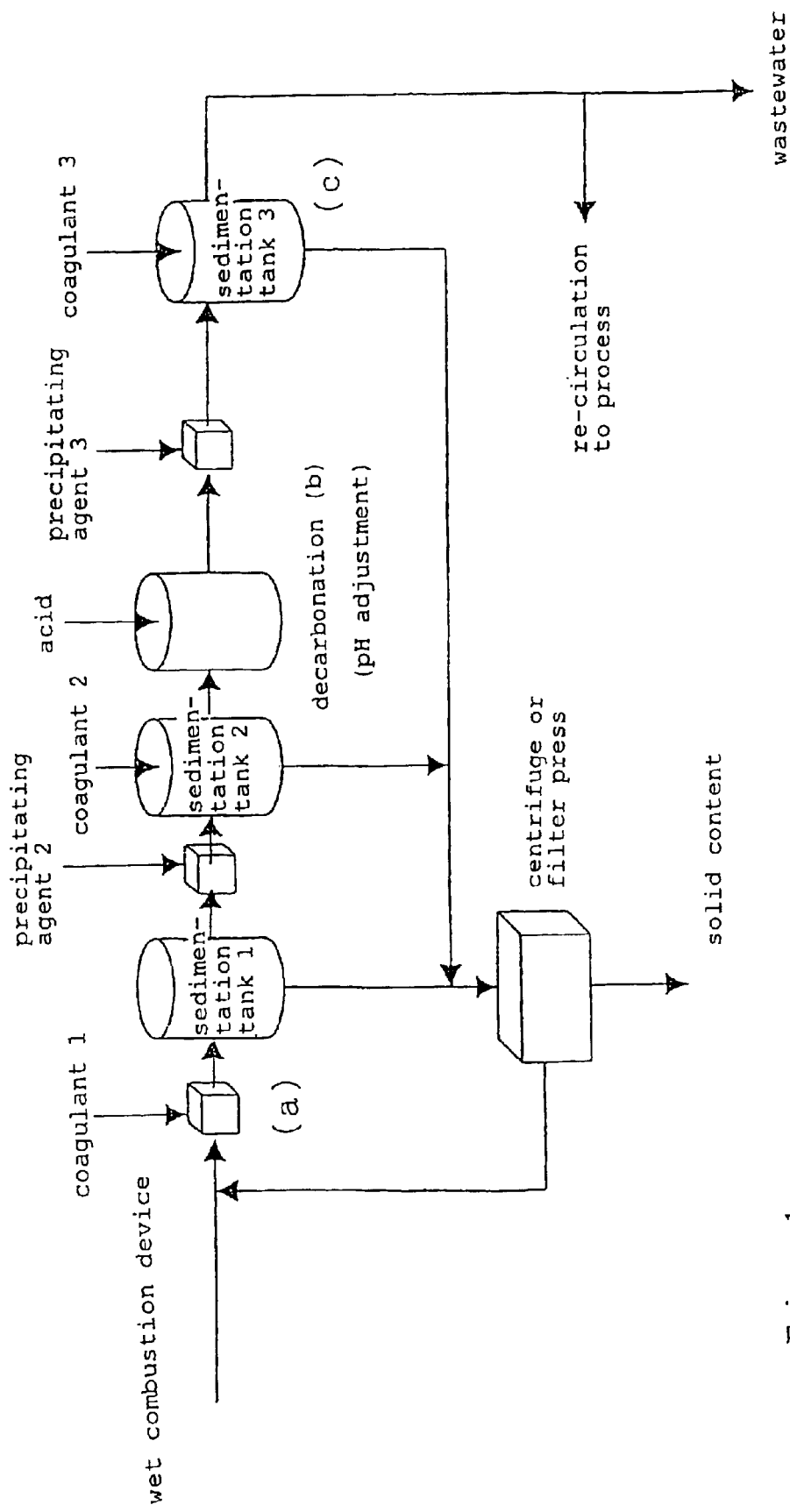
FIG. 1 is a schematic diagram of an embodiment mode of a method for removing a metal from wastewater according to the present invention.

Hereinafter, an embodiment mode of the present invention will be described with reference to a drawing, but the present invention is not limited to the drawing.

FIG. 1 is a schematic diagram showing an embodiment mode of the present invention.

First, treated liquid 1 is obtained by adding a coagulant 1 to wastewater treated in a wet combustion device and removing a solid content in a sedimentation tank 1 (step (a)). The removed solid content contains liquid as well. Therefore, it is preferable to separate the liquid using a centrifuge, a filter press, or the like and to re-circulate the liquid for removing a metal in the liquid.

Next, a precipitating agent 2 and a coagulant 2 are added to the treated liquid 1, and the precipitated solid content is removed in a sedimentation tank 2.

Treated liquid 2 is obtained by further adding an acid and conducting decarbonation (step (b)). A precipitating agent 3 and a coagulant 3 are added to the treated liquid 2, and the precipitated solid content is removed in a sedimentation tank 3, to thereby obtain final treated liquid.

EXAMPLES

Hereinafter, the present invention will be more specifically described by way of Examples and Comparative Examples. The present invention is not limited to the following Examples within the scope of the invention.

Agents used in the Examples are as described below.
Agent 1: NALCO 1460 (available from Nalco Japan Co., Ltd.)

Agent 2: NALMET (available from Nalco Japan Co., Ltd.)
Agent 3: NALCO 8131 (available from Nalco Japan Co., Ltd.)
Agent 4: NALCO 9601 (available from Nalco Japan Co., Ltd.)

Example 1

<Liquid Waste Composition>

Liquid waste resulting from an acrylic acid production process was subjected to wet combustion treatment using a wet combustion device, to thereby form opaque, dark brown (muddy water-like) wastewater of the following composition.

Copper: 200 ppm by weight (including solid content)
Molybdenum: 10 ppm by weight
Total solid content: 600 ppm by weight
pH: 9.4

<Operation 1-1> Addition of Coagulant (Solid Content Removal in Step (a))

4 ppm by weight of a coagulant (agent 1) with respect to the total wastewater was added, and the mixture was stirred for 3 minutes and then left at rest for 3 minutes. A whole solid content was settled (visual observation) for separation by filtration, to thereby obtain treated liquid 1. The treated liquid 1 was transparent with a slight tint of the blue. Metal concentrations in the treated liquid 1 were 15 ppm by weight of copper and 10 ppm by weight of molybdenum.

<Operation 1-2> Addition of Precipitating Agent and Coagulant in Combination (copper removal)

300 ppm by weight of a precipitating agent (agent 2) was added to the treated liquid 1 obtained as described above (operation 1-1), and the mixture was stirred for 5 minutes. Then, 4 ppm by weight of the coagulant (agent 1) was added thereto, and the mixture was stirred for 3 minutes and subsequently left at rest for 3 minutes. The whole solid content was settled (visual observation) for separation by filtration. The obtained treated liquid was clear and colorless, and the metal concentrations therein were 0.1 ppm by weight of copper and 10 ppm by weight of molybdenum.

<Operation 1-3> pH Adjustment (Decarbonation in Step (b))

5,000 ppm by weight of sulfuric acid was added to the treated liquid obtained as described above (operation 1-2) under stirring to adjust the mixture to a pH of 4, to thereby obtain treated liquid 2.

<Operation 1-4> Addition of Precipitating Agent and Coagulant in Combination (Metal (Molybdenum) Removal in Step (c))

500 ppm by weight of a precipitating agent (agent 3) was added to the treated liquid 2 obtained as described above (operation 1-3), and the mixture was stirred for 5 minutes. Then, 4 ppm by weight of a coagulant (agent 4) was added thereto, and the mixture was stirred for 3 minutes and subsequently left at rest for 5 minutes. The whole solid content was settled (visual observation) for separation by filtration, to thereby obtain final treated liquid. The final treated liquid was clear and colorless, and the metal concentrations in the final treated liquid were less than 0.1 ppm by weight of copper and 0.5 ppm by weight of molybdenum. Table 1 shows the results in detail.

Example 2

<Operation 2-1> (Solid Content Removal in Step (a))

The same wastewater as in Example 1 was stirred for 1 minute and then left at rest for 1 hour to settle a solid content without the use of a coagulant. The mixture was subjected to separation by filtration, to thereby obtain treated liquid 1.

The treated liquid 1 was slightly opaque because of floatation of fine particles. The metal concentrations in the treated liquid 1 were 30 ppm by weight of copper and 10 ppm by weight of molybdenum.

<Operation 2-3> pH Adjustment (Decarbonation in Step (b))

5,500 ppm by weight of sulfuric acid was added to the treated liquid 1 obtained as described above (operation 2-1) under stirring to adjust the mixture to a pH of 4, to thereby obtain treated liquid 2.

<Operation 2-4'> (Metal (Copper) Removal in Step (c))

An aqueous solution of sodium hydroxide (800 ppm by weight of sodium hydroxide) was added to the treated liquid 2, and the mixture was stirred for 3 minutes, left at rest for 20 minutes, and subjected to separation by filtration. Supernatant liquid had a pH of 10, and the metal concentrations therein were 2.0 ppm by weight of copper and 10 ppm by weight of molybdenum.

<Operation 2-4> (Metal (Molybdenum) Removal in Step (c))

The supernatant liquid obtained in the above operation 2-4' was subjected to the same operation as in the operation 1-4 of Example 1, to thereby obtain final treated liquid. The final treated liquid was clear and colorless, and the metal concentrations therein were 1 ppm by weight of copper and 1 ppm by weight of molybdenum. Further, the sulfuric acid concentration of the final treated liquid was 300 ppm by weight. Table 1 shows the results in detail.

Example 3

<Operation 3-2> (Copper Removal)

The same operations were conducted as in the operation 1-2 of Example 1 except that the operation 1-1 (solid content removal) of Example 1 was not conducted and an amount of the agent 2 was changed to 1,500 ppm by weight with respect to the wastewater, to thereby obtain treated liquid 1. The treated liquid 1 was clear and colorless, and the metal concentrations in the treated liquid 1 were 2 ppm by weight of copper and 10 ppm by weight of molybdenum.

<Operation 3-3> pH Adjustment (Decarbonation in Step (b))

5,000 ppm by weight of sulfuric acid was added to the treated liquid 1 obtained as described above (operation 3-2) under stirring to adjust the mixture to a pH of 4, to thereby obtain treated liquid 2.

<Operation 3-4> (Metal (Molybdenum) Removal in Step (c))

The treated liquid 2 obtained in the above operation 3-3 was subjected to the same operation as in the operation 1-4 of Example 1, to thereby obtain final treated liquid. The final treated liquid was clear and colorless, and the metal concentrations therein were 0.3 ppm by weight of copper and 0.9 ppm by weight of molybdenum. Table 1 shows the results in detail.

Comparative Example 1

<Operation 4-4> (Metal (Molybdenum) Removal in Step (c))

The treated liquid 1 obtained in the above operation 3-2 was subjected to the same operation as in the operation 1-4 of Example 1 except that the operation 3-3 (decarbonation) of Example 3 was not conducted and the amount of the agent 3 used was changed to 1,000 ppm, to thereby obtain final treated liquid. The final treated liquid was clear and colorless, and the metal concentrations therein were 1.1 ppm by weight of copper and 2.0 ppm by weight of molybdenum. Table 1 shows the results in detail.

Comparative Example 2

<Operation 5-3> pH Adjustment (Decarbonation in Step (b))

8,300 ppm by weight of sulfuric acid was added to the wastewater under stirring without conducting the operation 1-1 (solid content removal) and the operation 1-2 (copper removal) of Example 1 to adjust the mixture to a pH of 4, to thereby obtain treated liquid 2.

<Operation 5-4'> (Metal (Copper) Removal in Step (c))

An aqueous solution of sodium hydroxide (2,300 ppm by weight of sodium hydroxide) was added to the treated liquid 2, and the mixture was stirred for 3 minutes, left at rest for 20 minutes, and subjected to separation by filtration. Supernatant liquid had a pH of 10, and the metal concentrations therein were 3.3 ppm by weight of copper and 10 ppm by weight of molybdenum.

<Operation 6-4> (Metal (Molybdenum) Removal in Step (c))

The treated liquid obtained as described above (operation 6-3) was subjected to the same operation as in the operation 1-4 of Example 1 except that the amount of the agent 3 used was changed to 1,000 ppm by weight, to thereby obtain final treated liquid. The final treated liquid was clear and colorless, and the metal concentrations in the final treated liquid were less than 0.1 ppm by weight of copper and 2.0 ppm by weight of molybdenum. Table 1 shows the results in detail.

TABLE 1

| | Solid content removal | Copper removal | Decarbonation | Metal (copper) removal | Metal (molybdenum) removal |
|---|---|---|---|---|---|
| Example 1 | Agent 1: 4 ppm<br>Cu: 15 ppm/Mo: 10 ppm | Agent 2: 300 ppm<br>Agent 1: 4 ppm<br>Cu: 0.1 ppm/Mo: 10 ppm | Sulfuric acid: 5000 ppm<br>pH = 4 | | Agent 3: 500 ppm<br>Agent 4: 4 ppm<br>Cu < 0.1 ppm/Mo: 0.5 ppm |
| Example 2 | Cu: 30 ppm/Mo: 10 ppm | | Sulfuric acid: 5500 ppm<br>pH = 4 | NaOH: 800 ppm<br>pH = 10<br>Cu: 2.0 ppm/Mo: 10 ppm | Sulfuric acid: 300 ppm<br>pH = 6<br>Agent 3: 500 ppm<br>Agent 4: 4 ppm<br>Cu: 1 ppm/Mo: 1 ppm |
| Example 3 | Simultaneous with subsequent copper removal | Agent 2: 1500 ppm<br>Agent 1: 4 ppm<br>Cu: 2 ppm/Mo: 10 ppm | Sulfuric acid: 5000 ppm<br>pH = 4 | | Agent 3: 500 ppm<br>Agent 4: 4 ppm<br>Cu: 0.3 ppm/Mo: 0.9 ppm |
| Comparative Example 1 | Simultaneous with subsequent copper removal | Agent 2: 1500 ppm<br>Agent 1: 4 ppm<br>Cu: 2 ppm/Mo: 10 ppm | | | Agent 3: 1000 ppm<br>Agent 4: 4 ppm<br>Cu: 1.1 ppm/Mo: 2 ppm |
| Comparative Example 2 | | | Sulfuric acid: 8300 ppm<br>pH = 4 | NaOH: 2300 ppm<br>pH = 10<br>Cu: 3.3 ppm/Mo: 10 ppm | Sulfuric acid: 380 ppm<br>pH = 6<br>Agent 3: 1000 ppm<br>Agent 4: 4 ppm<br>Cu: 2 ppm/Mo: 1.7 ppm |
| Comparative Example 3 | Agent 1: 4ppm<br>Cu: 15 ppm/Mo: 10 ppm | Agent 2: 300 ppm<br>Agent 1: 4 ppm<br>Cu: 0.1 ppm/Mo: 10 ppm | | | Agent 3: 1000 ppm<br>Agent 4: 4 ppm<br>Cu < 0.1 ppm/Mo: 2 ppm |

<Operation 5-4> (Metal (Molybdenum) Removal in Step (c))

The supernatant liquid obtained in the above operation 5-4' was subjected to the same operation as in the operation 1-4 of Example 1 except that the amount of the agent 3 used was changed to 1,000 ppm, to thereby obtain final treated liquid. The final treated liquid was clear and colorless, and the metal concentrations therein were 2.0 ppm by weight of copper and 1.7 ppm by weight of molybdenum. Table 1 shows the results in detail.

Comparative Example 3

<Operation 6-1 (Solid Content Removal in Step (a))

The same wastewater as in Example 1 was used, to thereby obtain treated liquid 1 in the same manner as in Example 1

The treated liquid 1 was transparent with a slight tint of blue. Metal concentrations in the treated liquid 1 were 15 ppm by weight of copper and 10 ppm by weight of molybdenum.

<Operation 6-2> (Copper Removal)

300 ppm by weight of the precipitating agent (agent 2) was added to the treated liquid 1 obtained as described above (operation 6-1), and the mixture was stirred for 5 minutes. Then, 4 ppm by weight of the coagulant (agent 1) was added thereto, and the mixture was stirred for 3 minutes and subsequently left at rest for 3 minutes. The whole solid content was settled (visual observation) for separation by filtration, to thereby obtain treated liquid 1. The obtained treated liquid 1 was clear and colorless, and the metal concentrations therein were 0.1 ppm by weight of copper and 10 ppm by weight of molybdenum.

INDUSTRIAL APPLICABILITY

According to the present invention, a metal can be efficiently removed from the wastewater formed by subjecting the liquid waste to wet combustion treatment or wet oxidation treatment, said liquid waste resulting from an acrylic acid production process.

What is claimed is:

1. A method for removing metals including copper and molybdenum from wastewater formed by subjecting at least a part of liquid waste to wet combustion treatment or wet oxidation treatment, said liquid waste resulting from an acrylic acid production process involving the steps of forming acrylic acid through catalytic vapor phase oxidation of at least one of propane, propylene, and acrolein, and purifying the acrylic acid through distillation, wherein the method comprises the steps of:

(a) removing a solid content containing copper from the wastewater to obtain a treated liquid;

(b) adding an acid and removing carbonate ions and carbonate salts from the treated liquid obtained by the step (a); and (c) adding a precipitating agent and removing molybdenum from the treated liquid obtained by the step (b).

2. The method for removing metals from wastewater from acrylic acid production according to claim 1, wherein the method further comprises the step of removing copper between the step (a) and the step (b).

3. The method for removing metals from wastewater from acrylic acid production according to claim 1, wherein the method further comprises the step of removing copper between the step (b) and the step (c).

* * * * *